Aug. 28, 1951     T. F. FOSTER, JR     2,565,958
GARMENT SUPPORT FOR AUTOMOTIVE VEHICLES
Filed Jan. 6, 1947     2 Sheets-Sheet 1
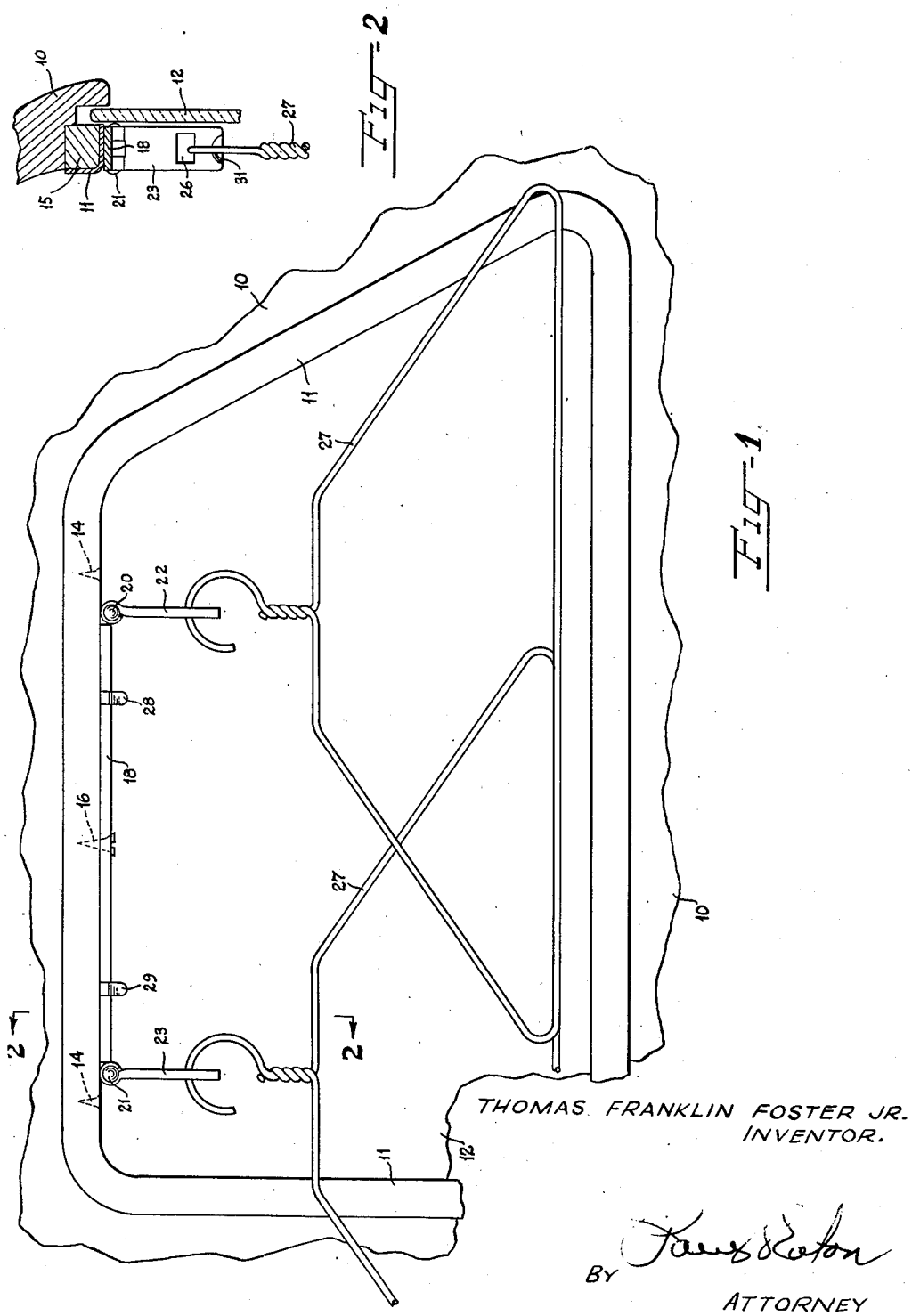
THOMAS FRANKLIN FOSTER JR.
INVENTOR.
By
ATTORNEY Aug. 28, 1951     T. F. FOSTER, JR     2,565,958
GARMENT SUPPORT FOR AUTOMOTIVE VEHICLES Filed Jan. 6, 1947     2 Sheets-Sheet 2

THOMAS FRANKLIN FOSTER JR.
INVENTOR.

BY
ATTORNEY

Patented Aug. 28, 1951

2,565,958

UNITED STATES PATENT OFFICE 2,565,958

GARMENT SUPPORT FOR AUTOMOTIVE VEHICLES

Thomas Franklin Foster, Jr., Asheboro, N. C.

Application January 6, 1947, Serial No. 720,378

1 Claim. (Cl. 211—86)

This invention relates to means attachable to the window frame or door frame of an automobile or other vehicle for suspending garment hangers and the like.

It is a well-known fact that in automobile passenger cars especially, there is very little accommodation for the hanging of garments inside the automobile while touring and it is an object of this invention to provide a bracket having a plurality of depending members preferably hingedly mounted and attachable to the window frame of the car whereby a plurality of garment hangers having suitable garments thereon may be suspended from said bracket. The invention, although shown as being associated with the side window of a car, it is quite evident that it can be attached to the frame of the rear window or any suitable window frame or any other portion of the automobile.

It is therefore an object of this invention to provide a bracket attachable to the framework of the body of an automotive vehicle such as a passenger car and having means for suspending therefrom a plurality of garment hangers on which garments may be safely carried without wrinkling and the like.

It is another object of this invention to provide means associated with and attachable to a portion of the interior of an automobile for suspending garment hangers therefrom.

Some of the objects of the invention having been stated, other objects will appear as the description proceeds, when taken in connection with the accompanying drawings in which Figure 1 is an elevation of a portion of the body of an automobile and showing my invention attached thereto and looking from the inside of the automobile;

Figure 2 is a vertical sectional view taken along the line 2—2 in Figure 1;

Figure 3:
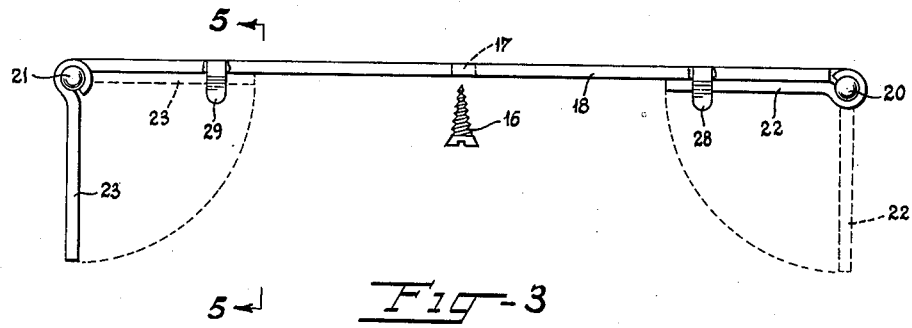
Figure 3 is a side elevation of the invention showing it removed from the automobile.
Figure 4:
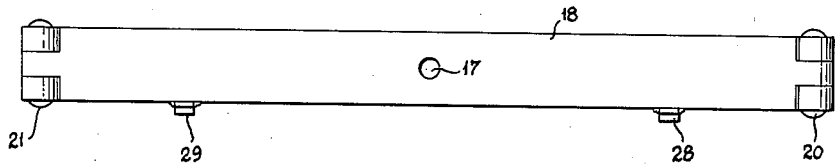
Figure 4 is a top plan view of the bracket.
Figure 5:
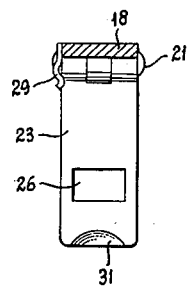
Figure 5 is a vertical sectional view taken along the line 5—5 in Figure 3.
Figure 6:
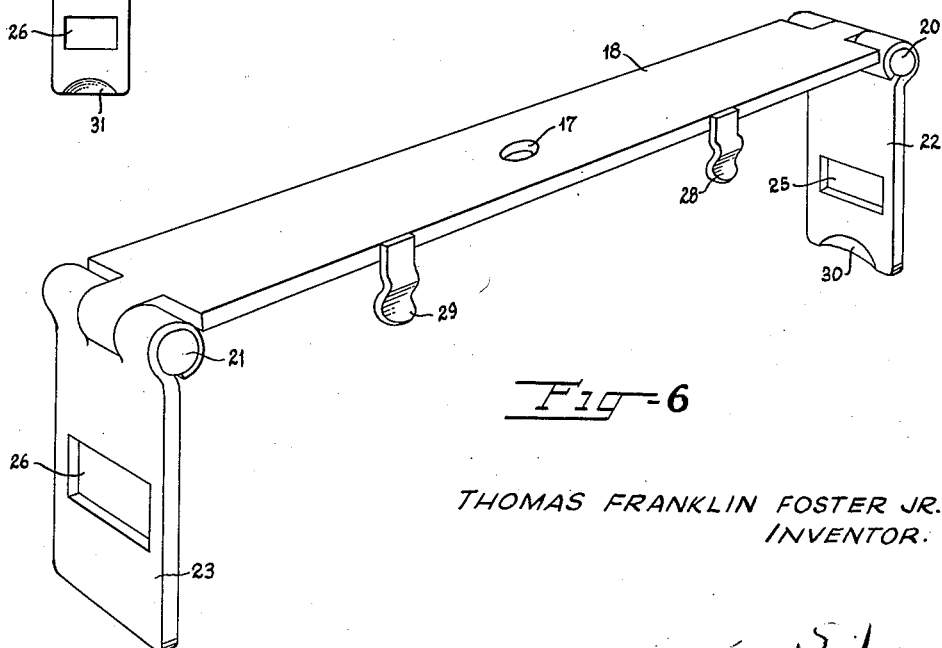
Figure 6 is an isometric view of the invention disassociated from an automobile.

Referring more specifically to the drawings, the numeral 10 indicates a portion of one of the side windows of an automobile of the coach or two-door type having a window frame which has mounted therein a pane of glass 12. This glass is usually confined within the door frame by strips 15, said strips having a metallic strip 11 covering the strips 15. There is a plurality of screws 14 penetrating a metallic strip 11 and embedded in the strips 15. In attaching my invention to this window structure, I remove one of the screws 14 and insert a longer screw 16 through a hole 17 in a plate member 18 to securely fasten it to the strip 11 of the window. The other screws 14 of the window frame are not disturbed.

This plate 18 has hinged as at 20 and 21 downwardly depending members 22 and 23 respectively. These members 22 and 23 have suitable openings 25 and 26 therein, through which the hooked portions of coat hangers 27 may be inserted before or after garments are placed thereon.

The plate 18 has a pair of leaf spring detents 28 and 29 welded to one edge thereof and which are adapted to engage the portions 22 and 23 to hold them in nested or folded position when not in use as illustrated in the right hand portion of Figure 3. These portions 22 and 23 likewise have cavities 30 near one end thereof, into which the fingernail can be inserted for pulling the same downwardly past the spring detents 28 and 29 respectively.

It is thus seen that I have provided a support which is easily attachable to a window or door frame of an automobile and which support is adapted to receive suitable coat hangers or other objects for suspending the same within the car in a convenient manner.

In the drawings and specification there has been set forth a preferred embodiment of the invention, and although specific terms are employed, they are used in a generic and descriptive sense only, and not for purposes of limitation, the scope of the invention being defined in the claim.

I claim:

A bracket adapted to be attached to the window frame of an automobile and having a hole through which a screw is adapted to be passed and to be imbedded in the window frame of the automobile, said bracket at each end thereof having pivoted thereto a downwardly depending member having means thereon for receiving an article to be suspended thereon, said bracket having extending downwardly therefrom near each end a detent adapted to engage the downwardly depending member at each end of the bracket when it is raised to a position parallel to the bracket.

THOMAS FRANKLIN FOSTER, JR.

REFERENCES CITED

The following references are of record in the file of this patent:

UNITED STATES PATENTS

| Number | Name | Date |
|---|---|---|
| D. 27,311 | Brickley | July 6, 1897 |
| 1,342,200 | Barber | June 1, 1920 |
| 1,383,025 | Reynolds | June 28, 1921 |
| 1,421,467 | Hardin | July 4, 1922 |
| 1,651,969 | Saxton | Dec. 6, 1927 |
| 2,348,139 | Lessin | May 2, 1944 |